US007636336B2

United States Patent
Forte et al.

(10) Patent No.: US 7,636,336 B2
(45) Date of Patent: Dec. 22, 2009

(54) METHODS AND SYSTEMS FOR REDUCING MAC LAYER HANDOFF LATENCY IN WIRELESS NETWORKS

(75) Inventors: Andrea G. Forte, Brooklyn, NY (US); Henning G. Schulzrinne, Leonia, NJ (US); Sangho Shin, New York, NY (US); Anshuman S. Rawat, Jersey City, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 526 days.

(21) Appl. No.: 11/070,936

(22) Filed: Mar. 3, 2005

(65) Prior Publication Data

US 2006/0062183 A1   Mar. 23, 2006

Related U.S. Application Data

(60) Provisional application No. 60/549,782, filed on Mar. 3, 2004.

(51) Int. Cl.
*H04W 4/00* (2006.01)

(52) U.S. Cl. .................. 370/331; 370/329; 370/338

(58) Field of Classification Search .................. None
See application file for complete search history.

(56) References Cited

U.S. PATENT DOCUMENTS

| | | | |
|---|---|---|---|
| 6,360,264 B1 | 3/2002 | Rom | |
| 6,366,561 B1 | 4/2002 | Bender | |
| 6,473,097 B1 | 10/2002 | Elliott | |
| 6,473,413 B1 | 10/2002 | Chiou et al. | |
| 6,654,361 B1 | 11/2003 | Dommety et al. | |
| 6,768,726 B2 | 7/2004 | Dorenbosch et al. | |
| 6,850,503 B2 | 2/2005 | Dorenbosch et al. | |
| 2002/0060995 A1 | 5/2002 | Cervello et al. | |
| 2002/0085719 A1 | 7/2002 | Crosbie | |
| 2002/0141375 A1 | 10/2002 | Choi | |
| 2002/0165990 A1 | 11/2002 | Singhal et al. | |
| 2002/0167965 A1 | 11/2002 | Beasley et al. | |
| 2002/0177460 A1 | 11/2002 | Beasley et al. | |
| 2002/0187749 A1 | 12/2002 | Beasley et al. | |
| 2002/0188723 A1 | 12/2002 | Choi et al. | |
| 2003/0035464 A1 | 2/2003 | Dehner et al. | |
| 2003/0036374 A1 | 2/2003 | English et al. | |
| 2003/0053437 A1 | 3/2003 | Bahl et al. | |
| 2003/0081583 A1 | 5/2003 | Kowalski | |
| 2003/0087646 A1 | 5/2003 | Funato et al. | |
| 2003/0091011 A1 | 5/2003 | Roberts et al. | |
| 2003/0134638 A1 | 7/2003 | Sundar et al. | |
| 2003/0142643 A1 | 7/2003 | Yang et al. | |

(Continued)

OTHER PUBLICATIONS

Geier, "Understanding 802.11 frame types," Technical report, Jupitermedia Corporation. Aug. 2002.

(Continued)

*Primary Examiner*—Erika A Gary
(74) *Attorney, Agent, or Firm*—Byrne Poh LLP

(57) ABSTRACT

In accordance with the present invention, computer implemented methods and systems are provided for reducing handoff latency in a wireless network. In response to detecting that a handoff is necessary, the present invention uses a selective scanning algorithm that includes the use of a channel mask and/or a caching algorithm for detecting one or more new access points.

23 Claims, 9 Drawing Sheets

U.S. PATENT DOCUMENTS

| | | |
|---|---|---|
| 2003/0142651 A1 | 7/2003 | Matta et al. |
| 2003/0174667 A1 | 9/2003 | Krishnamurthi et al. |
| 2003/0203735 A1 | 10/2003 | Andrus et al. |
| 2003/0229478 A1 | 12/2003 | Rappaport et al. |
| 2004/0008645 A1 | 1/2004 | Janevski et al. |
| 2004/0009751 A1 | 1/2004 | Michaelis et al. |
| 2004/0014422 A1 | 1/2004 | Kallio |
| 2004/0017796 A1 | 1/2004 | Lemieux et al. |
| 2004/0028009 A1 | 2/2004 | Dorenbosch et al. |
| 2004/0030791 A1 | 2/2004 | Dorenbosch et al. |
| 2004/0033805 A1 | 2/2004 | Verma et al. |
| 2004/0054798 A1 | 3/2004 | Frank et al. |
| 2004/0068668 A1 | 4/2004 | Lor et al. |
| 2004/0081119 A1 | 4/2004 | Zhong et al. |
| 2004/0087307 A1 | 5/2004 | Ibe et al. |
| 2004/0090929 A1 | 5/2004 | Laux et al. |
| 2004/0095924 A1 | 5/2004 | Holur et al. |
| 2004/0098588 A1 | 5/2004 | Ohba et al. |
| 2004/0103282 A1 | 5/2004 | Meier et al. |
| 2004/0106408 A1 | 6/2004 | Beasley et al. |
| 2004/0136348 A1 | 7/2004 | Han |
| 2004/0146021 A1 | 7/2004 | Fors et al. |
| 2004/0152417 A1 | 8/2004 | Kim et al. |
| 2004/0165563 A1 | 8/2004 | Hsu et al. |
| 2004/0176024 A1 | 9/2004 | Hsu et al. |
| 2004/0184422 A1 | 9/2004 | Shaheen |
| 2004/0196808 A1 | 10/2004 | Chaskar et al. |
| 2004/0196810 A1 | 10/2004 | Kil et al. |
| 2004/0202132 A1 | 10/2004 | Heinonen et al. |
| 2004/0203781 A1 | 10/2004 | Lefkowitz |
| 2004/0203783 A1 | 10/2004 | Wu et al. |
| 2004/0203788 A1 | 10/2004 | Fors et al. |
| 2004/0205158 A1 | 10/2004 | Hsu |
| 2004/0224690 A1 | 11/2004 | Choi et al. |
| 2004/0233840 A1 | 11/2004 | Bye |
| 2004/0236939 A1 | 11/2004 | Watanabe et al. |
| 2004/0240412 A1* | 12/2004 | Winget ........................ 370/331 |
| 2004/0240712 A1 | 12/2004 | Rowe et al. |
| 2005/0002407 A1 | 1/2005 | Shaheen et al. |
| 2005/0009565 A1 | 1/2005 | Kwak |
| 2005/0013276 A1 | 1/2005 | Ekl et al. |
| 2005/0018677 A1 | 1/2005 | Lee et al. |
| 2005/0025164 A1 | 2/2005 | Kavanagh et al. |
| 2005/0030924 A1 | 2/2005 | Yano et al. |

OTHER PUBLICATIONS

"Wireless LAN Medium Access Control (MAC) and Physical Layer (PHY) specifications," IEEE Std 802.11. 1999.

Kim et al., "Selective channel scanning for fast handoff in wireless LAN using neighbor graph," International Technical Conference on Circuits/Systems, Computers and Communications, Japan. Jul. 2004.

Mishra et al., "An Empirical analysis of the IEEE 802.11 MAC Layer Handoff process," ACM SIGCOMM Computer Communication Review, 33 (2): pp. 93-102, Apr. 2003.

Mishra et al., "Context catching using neighbor graphs for fast handoffs in a wireless network," Technical report, University of Maryland. Feb. 2004.

Pack et al., "Fast Inter-ap handoff using predictive-authentication scheme in a public wireless LAN," Networks2002. Jun. 2002.

* cited by examiner

METHODS AND SYSTEMS FOR REDUCING MAC LAYER HANDOFF LATENCY IN WIRELESS NETWORKS

CROSS REFERENCE TO RELATED APPLICATIONS

This application claims the benefit under 35 U.S.C. § 119 (e) of U.S. Provisional Patent Application No. 60/549,782, filed Mar. 3, 2004, which is hereby incorporated by reference herein in its entirety.

FIELD OF THE INVENTION

The present invention generally relates to wireless networks. More particularly, the present invention relates to reducing handoff latency in a wireless network.

BACKGROUND OF THE INVENTION

With the advent of wireless local area networks (LANs) and mobile devices, such as personal digital assistants, cellular telephones, and laptop computers, users can access the Internet, e-mails, files, and applications from virtually anywhere. Wireless LANs based on the IEEE 802.11 standard have become the predominant option for gaining wireless access to the Internet because of their low cost and unregulated bandwidth.

In recent years, much excitement has developed regarding the prospect of having a mobile device with the capability of the voice over internet protocol (sometimes referred to herein as "Voice over IP" or "VoIP") and similar applications used over an IEEE 802.11-based wireless LAN. VoIP allows voice and potentially other multimedia data types to be delivered between two or more parties over a network, such as the Internet, rather than traditional telephone lines. Data, whether computer information or audio data, is sent digitally in packed using the internet protocol. There is a great deal of public interest in this notion of having a mobile device that uses a common infrastructure to handle these types of data. For example, users are already attempting to make inexpensive long distance phone calls through the Internet using wireless LAN phones.

VoIP and other applications are problematic, however, due to the latency of the handoff process that is introduced when a mobile device moves from one access point (AP) to another. The handoff process generally involves two logical phases: a discovery phase, which includes handoff initiation and scanning, and a reauthentication phase, which includes authentication and association with a new access point. The amount of time needed to complete this handoff process is a sufficient amount that it causes broken speech, static, and/or dropped calls during VoIP communications.

Several attempts have been made to reduce handoff latency. One solution has been proposed that focuses on reducing the reassociation delay by using a caching mechanism located at the access point. (See, e.g., Mishra et al., "Context caching using neighbor graphs for fast handoffs in a wireless network," Computer Science Technical Report CS-TR-4477, University of Maryland, February 2004.) This caching mechanism is based on the Inter Access Point Protocol (IAPP) and is used to exchange client context information between neighboring access points. The cache in the access point is filled using the information contained in IAPP Move-Notify messages or reassociation requests sent to the access point by mobile devices. By exchanging the client context information with the old access point, the new access point does not require the client to send its context information in order to reassociate, thereby reducing the reassociation delay.

Another solution has been proposed that focuses on the 802.11 authentication process. (See, e.g., S. Pack et al., "Fast inter-AP handoff using predictive authentication scheme in a public wireless LAN," in Proc. IEEE Networks 2002 (Joint ICN 2002 and ICWLHN 2002), August 2002.) The authentication process is generally performed after the mobile device has already associated with a new access point. The IEEE 802.11 authentication delay is reduced by using a Frequent Handoff Region (FHR) selection algorithm that takes into account users' mobility patterns, service classes, etc.

However, while these solutions reduce the delay in the reauthentication phase, the discovery phase, and especially the scanning portion of the discovery phase, is the most time consuming part of the handoff process. The scanning portion attributes for over 90% of the total handoff latency, while the reassociation time is generally only a few milliseconds.

Other solutions have been proposed, such as the use of a selective scanning algorithm. (See, e.g., S. Kim et al., "Selective channel scanning for fast handoff in wireless LAN using neighbor graph," the 2004 International Technical Conference on Circuits/Systems, Computers and Communications (ITC-CSCC2004), Japan, Jul. 6-8, 2004.) However, this approach requires the use of neighbor graphs, multiple changes must be made to the network infrastructure, and IAPP must be used. In addition, this approach defines the scanning delay as the duration taken from the first probe request message to the last probe request message. This definition does not take into account the time needed by the client or mobile device to process the received probe responses. The processing performed by the client represents a significant portion of the scanning delay and increases significantly with the number of probe responses received by the mobile device.

Therefore, there is a need in the art for systems and methods for reducing the handoff latency in wireless networks by reducing the scanning time. Accordingly, it is desirable to provide systems and methods that overcome these and other deficiencies of the prior art.

SUMMARY OF THE INVENTION

In accordance with the present invention, computer-implemented methods and systems for reducing the handoff latency in a wireless network are provided. Generally, probe delay is substantially decreased by using a selective scanning algorithm and/or a caching algorithm.

In accordance with some embodiments of the present invention, systems and methods for reducing handoff latency for a mobile station in a wireless network are provided. In response to associating with a first access point, the mobile station stores key information that identifies the first access point in a cache located at the mobile station. In response to determining that a handoff is necessary, the mobile station queries the cache to determine whether another access point is associated with the key information.

The mobile station performs a selective scan of the channels at the mobile station upon determining that another access point is not associated with the key information. The selective scan includes accessing a channel mask that is associated with the mobile station, detecting one or more access points using the channel mask, and determining a second access point for association by the mobile station based at least in part on the responses from the one or more access points. In some embodiments, the mobile station may determining the second access point based at least in part on signal strength, signal-to-noise ratio, distance from the first access point, available bandwidth, and/or any other suitable parameter.

Upon determining the second access point, the mobile station stores information identifying the second access point into the cache, where it is associated with the key information of the first access point. The mobile station may transmit one or more messages to the second access point and associate with the second access point upon receiving permission from the second access point.

In accordance with some embodiments of the present invention, the mobile station may determine whether the signal strength of the first access point has decreased below a given threshold value.

In accordance with some embodiments of the present invention, the mobile station may determine whether the signal-to-noise ratio of the first access point has decreased below a given threshold value.

In accordance with some embodiments of the present invention, the mobile station may invert the channel mask if the mobile station does not detect one or more access points using the channel mask and detect one or more access points using the inverted channel mask.

In accordance with some embodiments of the present invention, the mobile station may determine whether the channel mask is associated with the mobile station and perform a scan of all channels at the mobile station upon determining that the channel mask is not associated with the mobile station.

In accordance with some embodiments of the present invention, the mobile station may transmit one or more requests to the first access point for information regarding neighboring access points.

In accordance with some embodiments of the present invention, when the wireless network is an 802.11b wireless network, the mobile station may add channel 1, channel 6, and channel 11 to the channel mask. The mobile station may also remove the channel that is currently being used to connect to the second access point from the channel mask.

In accordance with some embodiments of the present invention, the mobile station may configure a timer for accessing the second access point. In some embodiments, the timer may be set to 6 milliseconds.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

Various objects, features, and advantages of the present invention can be more fully appreciated with reference to the following detailed description of the invention when considered in connection with the following drawings, in which like reference numerals identify like elements.

DETAILED DESCRIPTION OF THE PREFERRED EMBODIMENTS

The following description includes many specific details. The inclusion of such details is for the purpose of illustration only and should not be understood to limit the invention. Moreover, certain features which are well known in the art are not described in detail in order to avoid complication of the subject matter of the present invention. In addition, it will be understood that features in one embodiment may be combined with features in other embodiments of the invention.

In accordance with the present invention, computer implemented methods and systems are provided for reducing the total handoff latency in a wireless network by significantly decreasing the scanning time.

Figure 1:
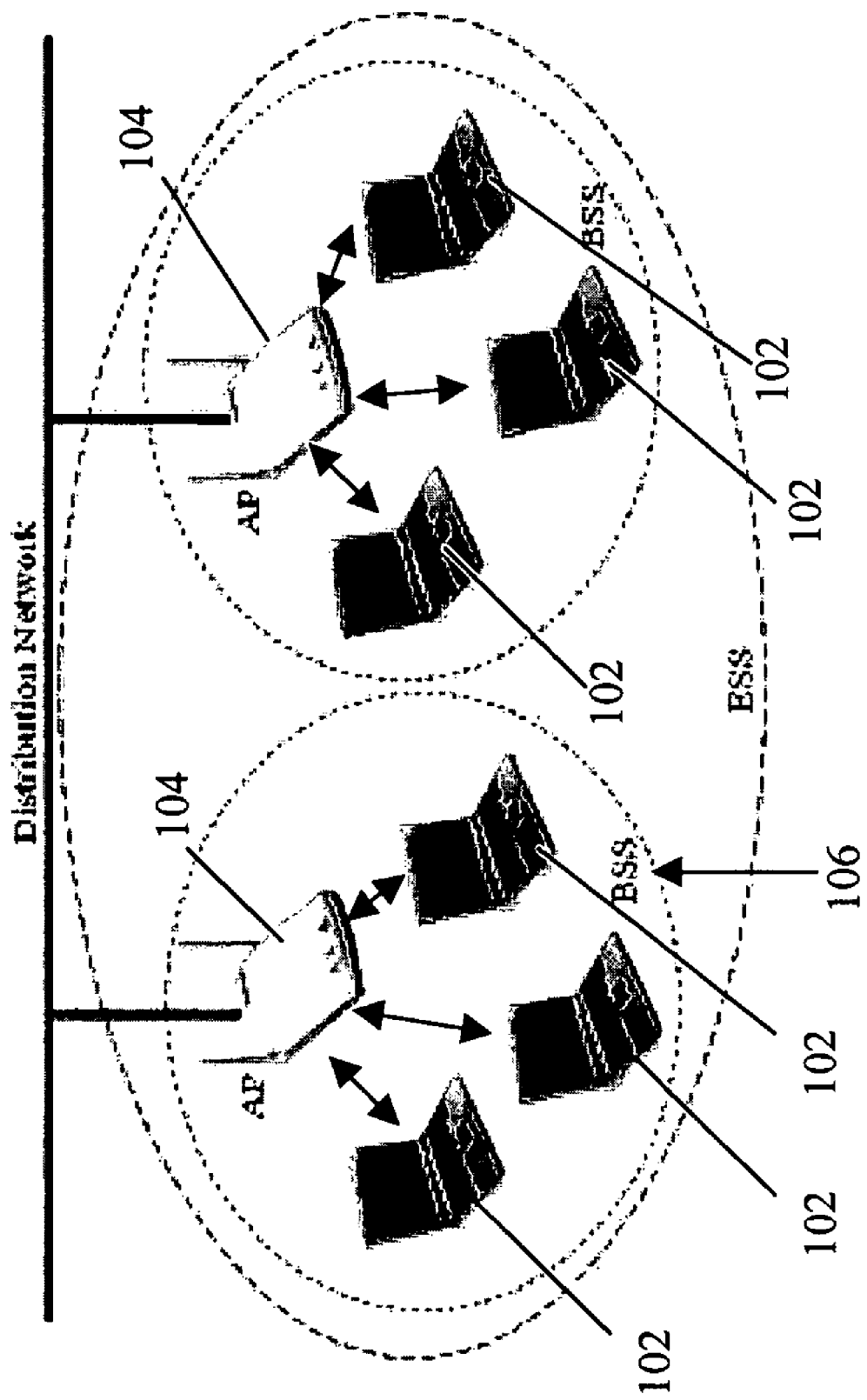
FIG. 1 is a schematic diagram of an illustrative system 100 suitable for implementation of an application that reduces handoff latency in accordance with some embodiments of the present invention.

FIG. 1 is a schematic diagram of an illustrative system 100 suitable for implementation of an application that reduces handoff latency in accordance with some embodiments of the present invention. As illustrated, system 100 may include one or more wireless stations (STA) 102. In some embodiments, station 102 may be a device that contains an IEEE 802.11 conformant medium access control (MAC) and physical layer (PHY) interface to the wireless medium. For example, the 802.11 functions may be implemented in the hardware and software of a network interface card (NIC) that is connected to the wireless station 102.

Alternatively, station 102 may be any device that is capable of accessing a wireless network. For example, station 102 may be any suitable platform (e.g., a personal computer (PC), a two-way pager, a wireless terminal, a portable telephone, a portable computer, a palmtop computer, an automobile PC, a laptop computer, a personal digital assistant (PDA), a combined cellular phone and PDA, etc.). Stations 102 may be local to each other or remote from each other, and are connected by one or more communications links to an access point (AP) 104 that is linked via a communications link to a distribution network. Access point 104 generally provides access to the distribution services via a wireless medium for associated stations 102.

In some embodiments, the handoff procedure is performed by the firmware or by a HostAP driver. The HostAP driver is a Linux driver for wireless LAN cards based on Intersil's Prism2/2.5/3 802.11 chipset. Wireless cards using these chipsets include, for example, the Linksys WPC11 PCMCIA card, the Linksys WMP11 PCI card, the ZoomAir 4105 PCMCIA card, and the D-Link DWL-650 PCMCIA card. The HostAP driver supports a command for scanning access points, handles the scanning results, and supports a command for joining to a specific access point. It may also be possible to disable the firmware handoff by switching to a manual mode and enabling the selective scanning algorithm.

In particular, FIG. 1 shows an infrastructure mode, where access point 104 provides connectivity to its associated stations 102 to form a basic service set (BSS) 106. Basic service set 106 is the basic building block of an 802.11 wireless LAN and consists of a one or more stations 102 controlled by a coordination function. Each wireless LAN is distinguished from another by a service set identifier (SSID). Accordingly, stations 102 and access points 104 attempting to become a part of a given wireless LAN may use the same SSID of the given wireless LAN. Wireless stations 102 generally use the SSID to establish and maintain connectivity with access points 104.

Although FIG. 1 and the following embodiments of the present invention generally relate to the infrastructure mode of the IEEE 802.11 MAC specification, these embodiments are not limited only to the infrastructure mode. Rather, the invention may also, for example, be applied to the ad hoc mode, where two or more stations within mutual communication range of each other establish a peer-to-peer relationship. In another suitable embodiment, the invention may be applied to other communications technologies, such as Bluetooth, etc.

The Institute of Electrical and Electronics Engineers (IEEE) created specifications for wireless LANs called the 802.11 standard. In recent years, the IEEE has expanded on the original standard to include at least three IEEE 802.11 standards: 820.11a, 802.11b, and 802.11g (collectively referred to herein as "IEEE 802.11" or "IEEE 802.11x"). The IEEE 802.11 standard is hereby incorporated by reference herein in its entirety. Because of the IEEE 802.11 specifications, wireless LANs based on the IEEE 802.11 standard are the predominant option for gaining wireless access to the Internet.

There are currently three IEEE 802.11 standards: 802.11a, 802.11b, and 802.11g. The 802.11a standard operates in the 5 GHz Industrial Scientific, and Medical (ISM) band, and it uses a total of thirty-two channels of which only eight do not overlap. The 802.11b and 802.11g standards both operate in the 2.4 GHz ISM band and use eleven of the fourteen possible channels in the United States. Of these eleven channels, only three do not overlap. While 802.11b may operate up to a maximum rate of 11 Mbit/s, the 802.11g and 802.11a standards may operate up to a maximum rate of 54 Mbit/s. The 802.11g standard is backwards-compatible with the 802.11b standard, while the 802.11a standard, because of the different ISM band, is not compatible with the other two.

It should be noted that while the number of channels used in the United States is eleven, these embodiments are not limited only to the IEEE 802.11b standard in the United States. For example, most of Europe uses thirteen channels for the 802.11b standard. Any suitable number of channels may also be used.

It should also be noted that although the following embodiments of the present invention generally relate to the IEEE 802.11b standard, these embodiments are not limited only to the IEEE 802.11b standard. Rather, the invention may also be applied to the IEEE 802.11a, IEEE 802.11g, any other suitable IEEE 802.11 standard, or any other suitable wireless communications protocol.

Figure 2:
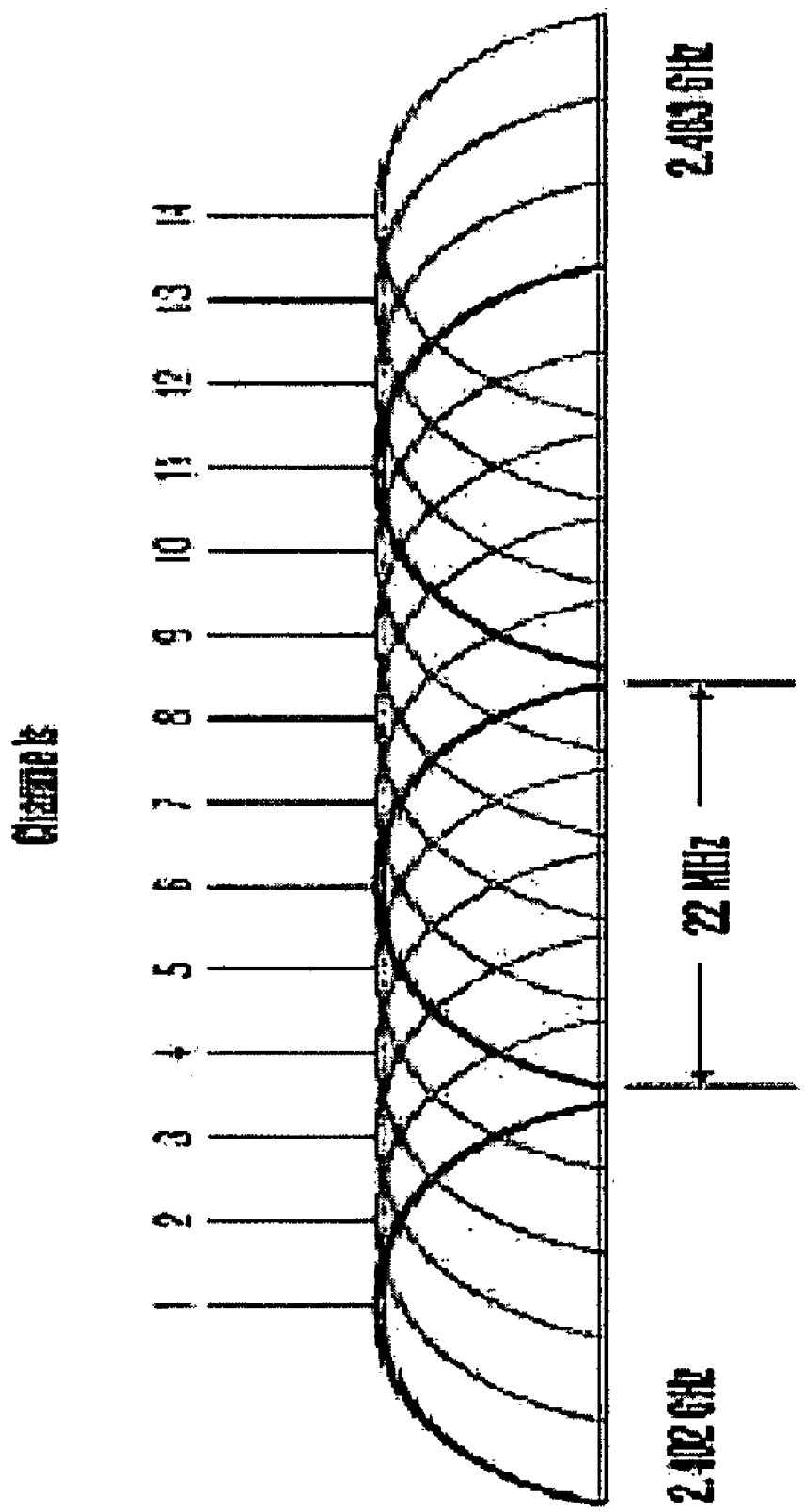
FIG. 2 shows a simplified illustration of the channel frequency distribution in the IEEE 802.11b standard.

FIG. 2 shows a simplified illustration of the channel frequency distribution in the IEEE 802.11b standard. As shown in FIG. 2, IEEE 802.11b generally defines a channel numbering scheme that allows the standard to be used in different locations with different radio band definitions. To accommodate these differences, IEEE 802.11b defines channels that occur every 5 MHz, beginning at one half of the bandwidth of the occupied channel above the start of the 2.4 GHz ISM band. Each bandwidth occupies 22 MHz: 11 MHz above the channel center and 11 MHz below the channel center. To comply with the regulations for out-of-band emissions below 2.4 GHz, IEEE 802.11b includes a 1 MHz guard band at the bottom of the band. Accordingly, starting at 2.4 GHz, channel 1 sits at 2.412 GHz (i.e., 2.4 GHz+1 MHz for the guard band+11 MHz for half of the occupied signal bandwidth). An IEEE 802.11b transmitter that is set at channel 1 transmits a signal from 2.401 GHz to 2.423 GHz.

It should be noted that any other signal that overlaps any part of the signal on channel 1 may result in some degree of interference. To completely avoid this overlap, the lower edge of the next IEEE 802.11b signal must not be below 2.423 GHz. Because each IEEE 802.11b channel is located every 5 MHz above 2.412 GHz, the next channel that does not overlap with channel 1 is channel 5, at 2.437 GHz, which occupies the band from 2.426 GHz to 2.448 GHz. Subsequently, channel 9 is the next channel above channel 5 without overlap. However, because the use of channels 1, 5, and 9 leaves 10 MHz of band unused, the channels are spread out to channels 1, 6 and 11, to completely utilize the band that is available. Thus, in a well configured wireless network, some or all of the access points will operate on these non-overlapping channels (i.e., channels 1, 6, and 11).

The IEEE 802.11 standard includes management frames that allow stations to enable and maintain communications with, for example, an access point when operating in an infrastructure or a station when operating in an ad hoc network. IEEE 802.11 management frame subtypes include at least, for example, an authentication frame, an association request frame, an association response frame, a reassociation request frame, a reassociation response frame, a disassociation frame, a beacon frame, an authorization frame, a probe request frame, and a probe response frame.

IEEE 802.11 authentication is a process where the access point accepts or rejects the identity of the station. More particularly, the authentication process determines whether to establish the identity of a station as a member of the set of stations authorized to associate with another station. Generally, a station begins the authentication process by sending an authentication frame containing its identity to the access point. With open system authentication (which may be a default setting), the station sends only one authentication frame and the access point responds with an authentication frame as a response indicating acceptance or rejection of the station.

IEEE 802.11 association is a process where the access point allocates resources for and synchronizes with a station. In particular, the association process may establish access point/station mapping and enable station invocation of the distribution system services. Generally, a station begins the association process by sending an association request to an access point. This request transmits information about the station (e.g., supported data rates) and the SSID of the network that the station wishes to associate with. Upon receiving the association request, the access point determines whether to associate with the station. If the access point associates with the station, it reserves space in the memory and generates an association identification for the station.

The access point then sends an association response frame that includes an acceptance or rejection notice to the station that is requesting association. If the access point accepts the station, the association response frame includes information regarding the association, such as association identification and supported data rates. If the outcome of the association is positive, the station may utilize the access point to communicate with other stations on the network and systems on the distribution (e.g., Ethernet) side of the access point.

In some embodiments, if a station roams away from the currently associated access point (e.g., such that the beacon signal of the currently associated access point decreases below a given threshold or a given signal strength), the station may attempt to find another access point having a stronger beacon signal. During these attempts to find a new access point, the station may transmit a reassociation frame to the new access point. The new access point then coordinates the forwarding of data frames that may still be in the buffer of the previous access point waiting for transmission to the station.

The new access point sends a reassociation response frame containing an acceptance or rejection notice to the station requesting reassociation. Similar to the association process, the frame includes information regarding the association, such as association identification and supported data rates.

In some embodiments, a station may send a disassociation frame to another station if it wishes to terminate the existing association. For example, a station that is shut down gracefully may send a disassociation frame to alert the access point that the station is powering off. The access point may then relinquish memory allocations and remove the station from the association table.

In some embodiments, the access point may send a beacon frame to announce its presence and relay information, such as timestamp, SSID and other parameters regarding the access point, to stations that are within range. The beacon frame may be sent periodically, at predetermined times, or any other suitable time.

In some embodiments, a station may send a probe request frame when it needs to obtain information from another station. For example, a station may send a probe request to one or more stations to determine which access points are within range. In response to receiving the probe request frame, another station may respond by transmitting a probe response frame. The probe response frame may include, for example, capability information, supported data rates, or any other suitable information relating to the access points within range.

As described above, these IEEE 802.11 management frames may be used when, for example, a station (e.g., a mobile device) moves from the coverage area of one access point to the coverage area of another access point (i.e., handoff). The handoff process generally involves exchanging a sequence of messages between the station and one or more access points that are within range of the station. The handoff process is divided into two logical steps: discovery and reauthentication.

The discovery process involves the handoff initiation phase and the scanning phase. As a station moves away from the access point that it is currently associated with, the signal strength and the signal-to-noise ratio of the signal from the access point decrease. When these properties of the signal from the access point fall below a given threshold (e.g., a given signal strength, a given signal-to-noise ratio, or any other suitable threshold value), the station initiates a handoff, thereby causing the station to attempt to find other access points that it may connect to. To find other access points, the station (e.g., a mobile device) performs a MAC layer scanning function.

The scanning phase may be performed in passive mode or active mode. In passive mode, the station listens to the wireless medium for beacon frame. Beacon frames provide a combination of timing and advertising information to the stations. Using the information obtained from beacon frames, the station may elect to join an access point. During this scanning mode, the station listens to each channel of the physical medium to attempt to locate an access point.

In active mode, the station transmits probe request frames in the wireless medium and processes the received probe responses from the access points. The active scan mode generally includes the following steps:

1. Using the normal channel access procedure, Carrier Sense Multiple Access with Collision Avoidance (CSMA/CA), to gain control of wireless medium.
2. Transmit a probe request frame which contains the broadcast address as destination.
3. Start a probe timer.
4. Listen for probe responses.
5. If no response has been received by minChannelTime, scan next channel.
6. If one or more responses are received by minChannelTime, stop accepting probe responses at maxChannelTime and process the received responses.
7. Move to next channel and repeat the above steps 1-6.

After all of the channels have been scanned, the station may determine which access point to associated with next based at least in part on the information received from the probe responses.

The reauthentication process involves authentication and reassociation to the new access point as well as transfer of the station's credentials and other information from the old access point to the new access point. Authentication is a process by which the access point either accepts or rejects the identity of the station. The station begins the process by sending the authentication frame, authentication request, and information the access point of its identity. In response, the access point transmits an authentication response that indicates acceptance or rejection of the station. After successful authentication, the station sends a reassociation request to the new access point which, in response, sends a reassociation response back to the station containing an acceptance or rejection notice.

Figure 3:
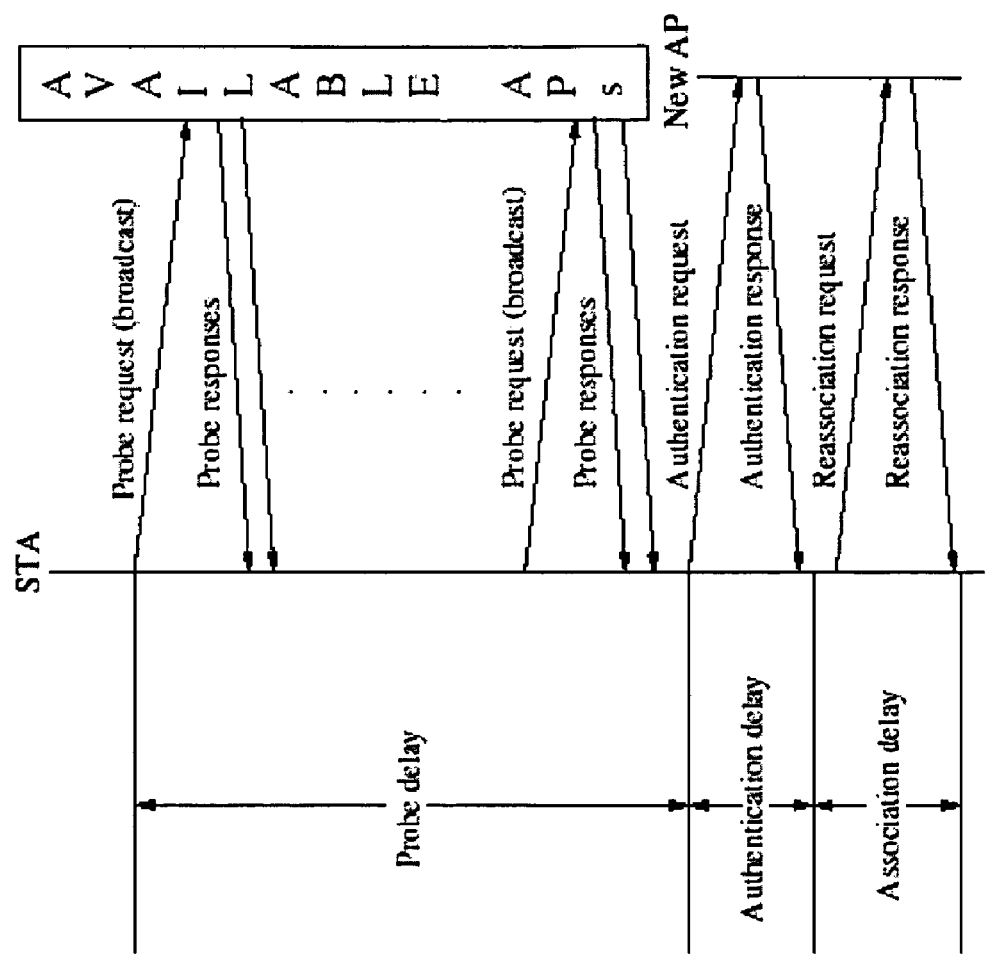
FIG. 3 shows a simplified illustration of the handoff process using active scanning.

As shown in FIG. 3 and as described above, during active scanning, the transmitted messages between the station and the one or more access points may be divided into three types: probe messages, authentication messages, and reassociation messages.

Probe messages: Once the station decides to look for other access points, the probing process starts. The station starts sending out probe requests and then processes received probe responses based on the active scanning algorithm, which is described further below. The time involved in this probing process is called probe delay.

Authentication messages: Once the station decides to join an access point, authentication messages are exchanged between the station and the selected access point. The time consumed by this process is called authentication delay.

Reassociation messages: After a successful authentication, the station sends a reassociation request and expects a reassociation response back from the access point. These messages are responsible for the reassociation delay.

Figure 4B:
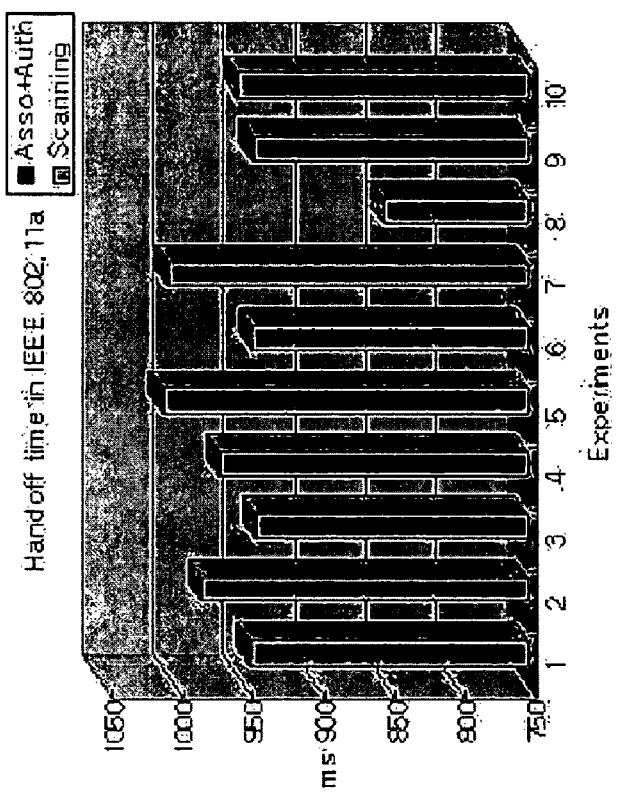
FIGS. 4A and 4B are illustrative graphs that shows the handoff time in the IEEE 802.11b standard and the IEEE 802.11a standard, respectively.
Figure 4A:
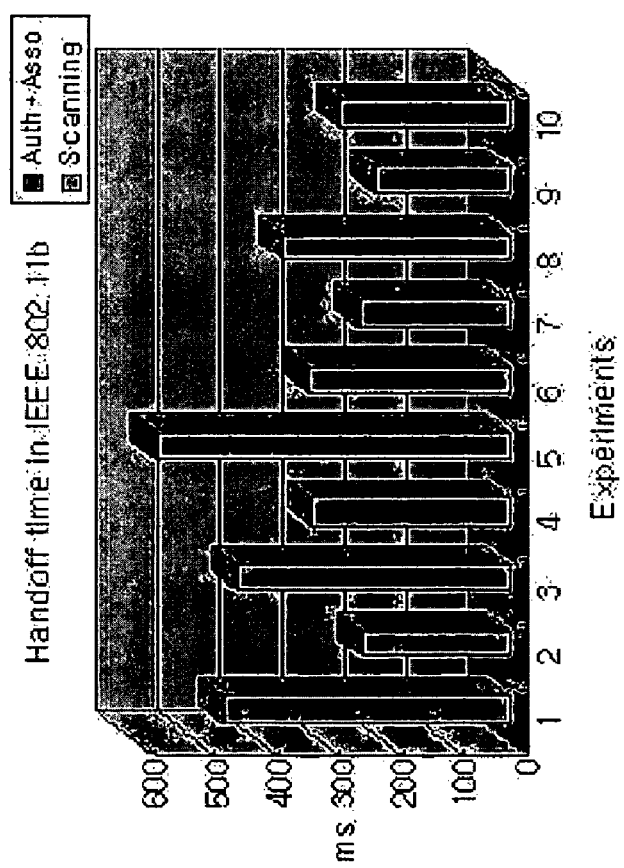

FIG. 4 shows that probe delay accounts for at least 90% of the handoff latency when compared to authentication and association.

In accordance with the present invention, in order to reduce the probe delay, the present invention includes at least a selective scanning algorithm and a caching algorithm. Generally, the probe delay is substantially decreased by improving the scanning procedure using the selective scanning algorithm. In addition, some embodiments of the present invention may include the caching algorithm to minimize the use of the selective scanning algorithm.

Figure 5:
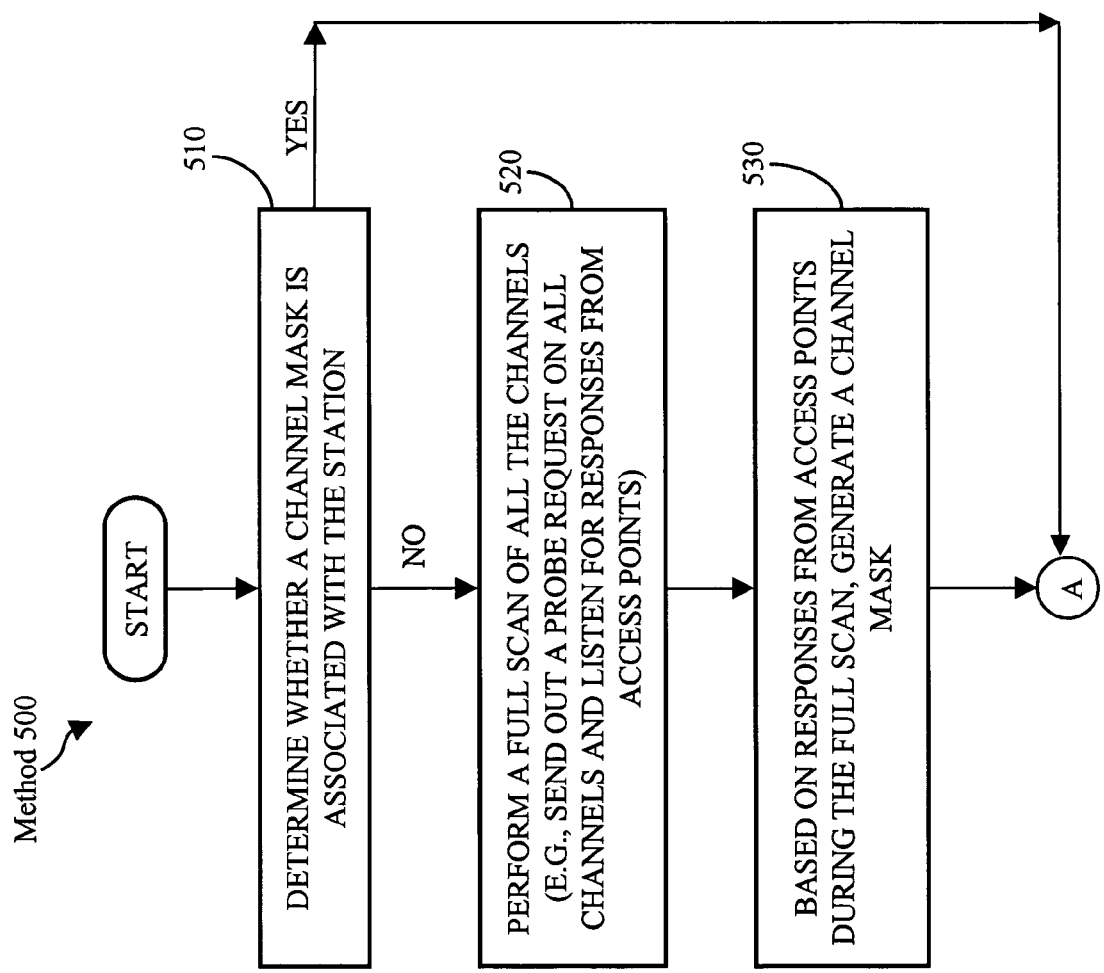
FIGS. 5 and 6 are simplified flowcharts illustrating the steps performed in reassociating with a new access point in accordance with some embodiments of the present invention.
Figure 6:
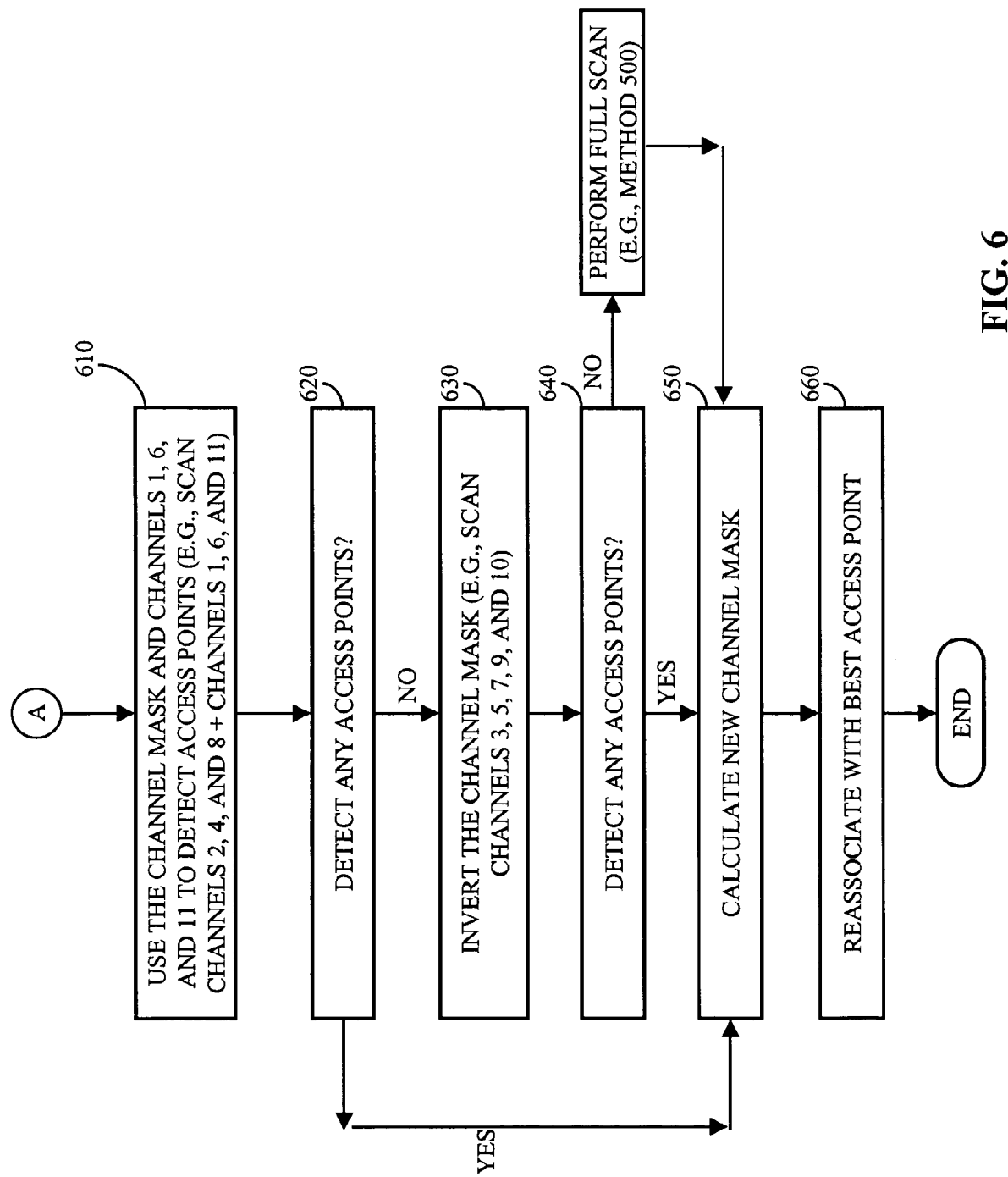

FIGS. 5 and 6 are simplified flowcharts illustrating the steps performed in reassociating with a new access point in accordance with some embodiments of the present invention. These are generalized flowcharts. It will be understood that the steps shown in FIGS. 5 and 6 may be performed in any suitable order, some may be deleted, and others added.

At step 510, the station may determine whether a channel mask is associated with the station. When a channel mask is not detected, the station may perform a full scan of all of the channels at step 520. For example, the station may send out a probe request on each channel and listen for responses from access points. It should be noted that, in some embodiments, the full scan may be automatically performed when a station is powered on.

Based on the responses from the access points (e.g., receiving information relating to an access point), the station generates a channel mask (step 530). Generally, the station determines the best access points based on, for example, signal strength, signal-to-noise ratio, available bandwidth, or any other suitable parameter. In some embodiments, the channel mask may be set by turning on all of the bits for all channels in which a probe request was heard by an access point. Alternatively, the station may turn on the bits in the channel mask for a given number of preferred access points (e.g., the two access points with the strongest signal strength, the three closest access points to the station, etc.).

As described previously, among the 14 possible channels that may be used in accordance with IEEE 802.11b, only three of those channels do not overlap (i.e., channels 1, 6, and 11). Accordingly, the bits for channels 1, 6, and 11 are also set in the channel mask as these channels have a high probability of being used by access points (step 610).

Using the channel mask, the station searches for a new access point with which to reassociate (e.g., the best access point, the access point with the strongest signal strength from among the scanned access points, the access point with the strongest signal-to-noise ration from among the scanned access point, etc.).

If no access points are detected using the channel mask, the station may invert the channel mask (step 630). For example, if the 802.11b channel mask is set to scan channels 1, 2, 4, 6, 8, and 11, the inverted channel mask scans channels 3, 5, 7, 9, and 10. At step 640, the inverted channel mask is used to detect if there are any access points that the station may connect to. If no access points are detected using the inverted channel mask, the station performs a full scan to generate a new channel mask (e.g., step 520 and 530).

If a new access point is detected and is capable of being connect to by the station, the station may update the channel mask. For example, the station may reset the bit corresponding to the channel that the station is using to connect to the new access point as the probability of finding an adjacent or neighboring access point on the same channel of the newly detected access point is low. The bits in the channel mask are adjusted in accordance with the following formula:

new channel mask=scanned channels (e.g., step 520 and 530)+channel 1+channel 6+channel 11−the current channel.

Upon updating the channel mask, the station sends the appropriate messages to reassociate with the new access point.

In some embodiments, the station may also include a caching algorithm along with the selective scanning algorithm. For example, the caching algorithm may include a table that uses the MAC address of the current access point as the key, where a list of MAC addresses for connection with the station is associated with the key.

Figure 7:
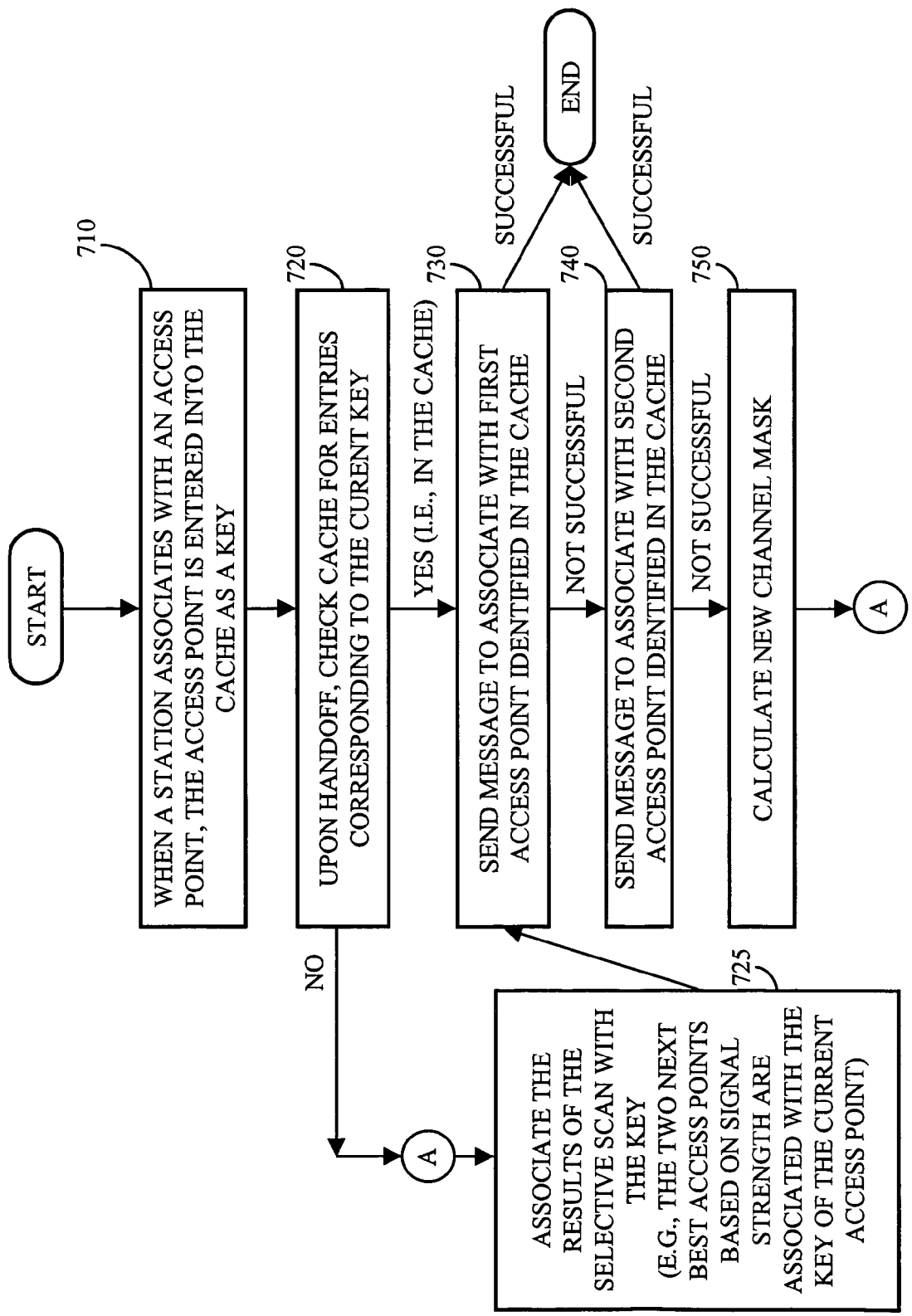
FIG. 7 is a simplified flowchart illustrating the steps performed in using a cache to reduce handoff latency in accordance with some embodiments of the present invention.

FIG. 7 is a simplified flowchart illustrating the steps performed in using a cache to reduce handoff latency in accordance with some embodiments of the present invention. This is a generalized flow chart. It will be understood that the steps shown in FIG. 7 may be performed in any suitable order, some may be deleted, and others added.

At step 710, when the station associates with an access point, the access point is entered into a cache located at the station as a key. For example, the MAC address, IP address, location description, or any other suitable indicator of the currently associated access point is stored in the cache as a key. Other access points (e.g., next best access point by signal strength, neighboring access points, closest access point, best access points by load or congestion, etc.) may be associated with the currently associated access point by associating information relating to the other access points with the key. When a handoff is needed because the signal falls below a given threshold (e.g., a given signal strength, a given signal-to-noise ratio, or any other suitable threshold value), the station determines whether the cache has entries (e.g., access points) corresponding to the key (step 720). Entries may include, for example, one or more addresses for the next best access points, one or more addresses for neighboring access points, etc. For example, the cache may have a size of ten and a width of two such that it may store ten keys and two access points in the cache list.

If there are no entries associated with the key, the station performs the selective scanning algorithm (see, e.g., FIGS. 5 and 6). Upon performing the selective scanning algorithm, the station may associate the results of the selective scanning algorithm with the current key at step 725. For example, the selective scanning algorithm may determine that BESTAP1 and SECONDBESTAP2 are, based on signal strength, the two next best access points other than the current access point. In response to this determination, the station associates BESTAP1 and SECONDBESTAP2 with the current key related to the current access point. However, any other suitable number of access points may be determined and related to the current access point.

Upon finding an entry (e.g., another access point) associated with the current key in the cache, the station may send one or more messages to associate with a first access point (e.g., AP1) corresponding to the entry (step 730). However, if the station is not successful in associating with the first access point, the station may check the cache for another entry and send one or more messages to associate with a second access point (step 740). It should be noted that while FIG. 7 shows that the cache stores the next two best access points based on signal strength, any suitable number of access points (e.g., MAC numbers) may be stored.

If the station is not successful is associating with the second access point (or after any other suitable number of access points), the station may calculate a new channel mask by performing the selective scanning algorithm (see, e.g., FIGS. 5 and 6) (step 750).

It should be noted that although the cache and the following embodiments of the present invention generally describe the cache as being populated by using the selective scanning algorithm, the current key in the cache may be populated with information relating to access points while the station is roaming. For example, when the station has detected that it is moving to a certain location (e.g., down a given hallway), the station may be allowed to receive beacon frames from one or more access points. The beacon frame announces the presence and relay information (e.g., timestamp, SSID, and any other suitable parameters relating to the access point) of a detected access point. In another suitable embodiment, the station may send a message to the current access point requesting that the access point transmit information relating to all neighboring access points (e.g., other access points in the area, other access points with strong signals, etc.) to the station. In response to receiving such information from the current access point, the station may populate the cache with the information. In addition, it may be combined with a positioning algorithm (e.g., a GPS or a WiFi positioning algorithm) that allows the cache to be populated and refreshed in real-time based upon the position of the station.

As shown in the flowchart of FIG. 7, the selective scanning algorithm may not be used if one or more access points associated with the current access point are stored in the cache at the station (cache hit). Using both the selective scanning algorithm and the cache algorithm, the station generally takes less than 5 ms to associate with a new access point. However, when the station attempts to associate with the new access point, the firmware generally waits for a substantial amount of time to determine that the station has failed to associate with the new access point (e.g., up to 15 milliseconds). The selective scanning algorithm and/or the cache algorithm may be configured to set a timer that expires after, for example, about 6 milliseconds. Accordingly, to reduce this time-to-failure, the timer is configured to override the firmware. When the timer expires, the station performs a new selective scan using a new channel mask.

It should be noted that a cache miss does not significantly affect the handoff latency. As described previously, when a cache miss occurs, the time-to-failure is generally only 6 ms. For example, if the first cache entry misses and the second one hits, the additional handoff delay is only 6 ms. When both cache entries miss, the total handoff delay is 12 ms plus the time to execute the selective scanning algorithm. Nevertheless, all of this still resulting in a significant improvement compared to the original handoff time.

Figure 8:
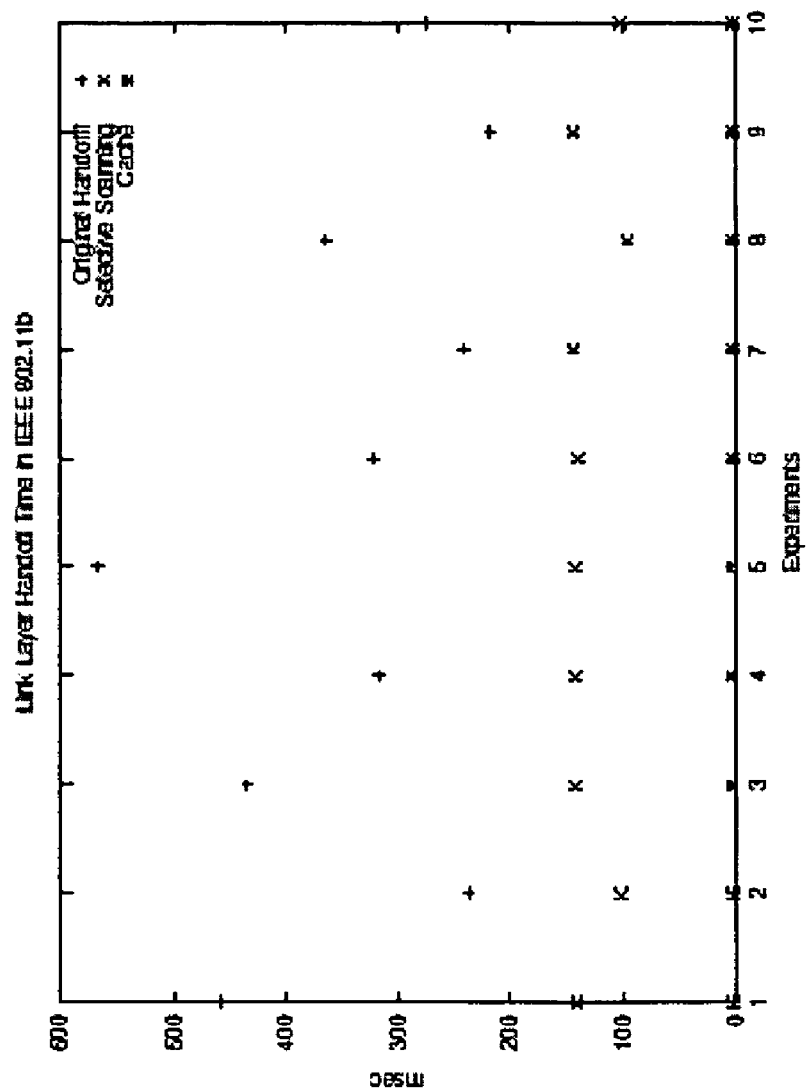
FIG. 8 shows the total handoff time using the selective scanning algorithm and/or caching algorithm in accordance with some embodiments of the present invention.

FIG. 8 shows the total handoff time using the selective scanning algorithm and/or caching algorithm in accordance with some embodiments of the present invention. As shown in FIG. 8 and in Table 1 below, the total handoff was substantially reduced with the use of the selective scanning algorithm. When the selective scanning algorithm is used, an average reduction of 40% in handoff time is obtained. It should be noted that when the caching algorithm is used along with the selective scanning algorithm, more than 90% of the handoff time was removed.

TABLE 1 shows handoff delay (in ms) of the 802.11b in the link layer (also shown in FIG. 8).

| | Experiment | | | | | | | | | | |
|---|---|---|---|---|---|---|---|---|---|---|---|
| | 1 | 2 | 3 | 4 | 5 | 6 | 7 | 8 | 9 | 10 | avg |
| Original handoff | 457 | 236 | 434 | 317 | 566 | 321 | 241 | 364 | 216 | 274 | 343 |
| Selective scanning | 140 | 101 | 141 | 141 | 141 | 139 | 143 | 94 | 142 | 101 | 129 |
| Caching | 2 | 2 | 4 | 3 | 4 | 2 | 2 | 2 | 2 | 2 | 3 |

Figure 10:
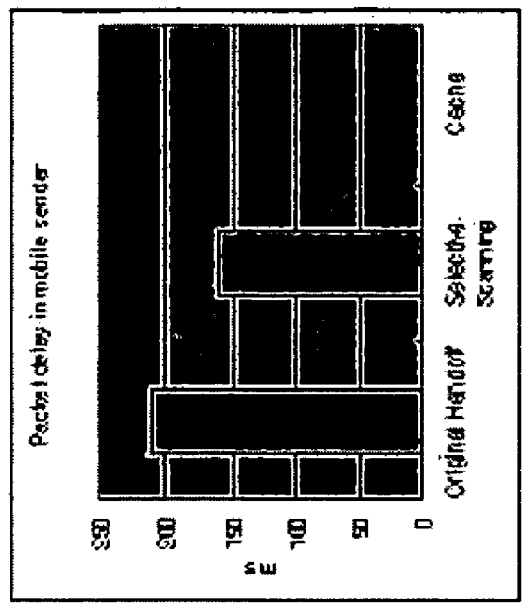
FIGS. 9 and 10 show the measured packet loss in a mobile receiver and the packet delay (in ms) in a mobile sender, respectively, in accordance with some embodiments of the present invention.
Figure 9:
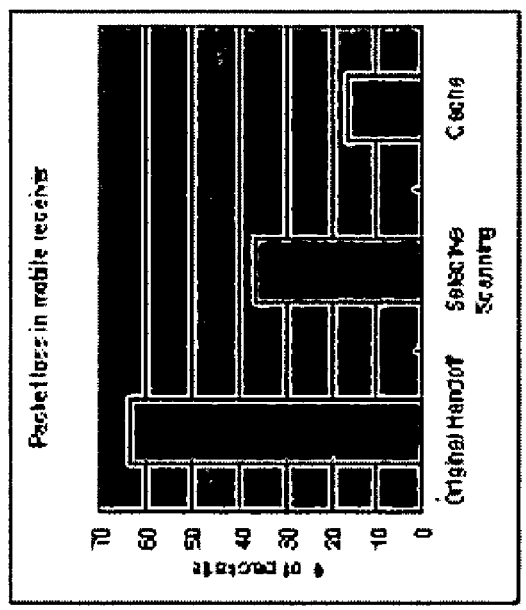

Another measurement was performed to determine the packet loss during the handoff process. To determine the packet loss, user datagram protocol (UDP) packets were transmitted to and from a station to simulate voice traffic during the handoff. It should be noted that transmitting data packets during the handoff process adds to the handoff delay. In particular, data packets that are transmitted between the last probe response and the authentication request add to the handoff delay. However, it should also be noted that this behavior is observed when the station performing the handoff is the sender. Alternatively, when the station performing the handoff is the receiver, no such delay is introduced. FIGS. 9 and 10 show the measured packet loss in a mobile receiver and the packet delay (in ms) in a mobile sender, respectively, in accordance with some embodiments of the present invention.

TABLE 2 shows the measured packet loss during the handoff process when the station was the sender.

| | Experiment | | | | | | | | | | |
|---|---|---|---|---|---|---|---|---|---|---|---|
| | 1 | 2 | 3 | 4 | 5 | 6 | 7 | 8 | 9 | 10 | avg |
| Original Handoff | 36 | 55 | 32 | 79 | 37 | 122 | 134 | 32 | 69 | 36 | 63 |

TABLE 2-continued shows the measured packet loss during the handoff process when the station was the sender.

| | Experiment | | | | | | | | | | |
|---|---|---|---|---|---|---|---|---|---|---|---|
| | 1 | 2 | 3 | 4 | 5 | 6 | 7 | 8 | 9 | 10 | avg |
| Selective Scanning | 88 | 24 | 26 | 19 | 31 | 28 | | 46 | 26 | 64 | 18 | 37 |
| Cache | 16 | 15 | 14 | 14 | 16 | 15 | | 23 | 21 | 15 | 14 | 16 |

TABLE 3 shows the measured packet loss during the handoff process when the station was the receiver.

| | Experiment | | | | | | | | | | |
|---|---|---|---|---|---|---|---|---|---|---|---|
| | 1 | 2 | 3 | 4 | 5 | 6 | 7 | 8 | 9 | 10 | avg |
| Original Handoff | 281 | 229 | 230 | 210 | 209 | 227 | 185 | 174 | 189 | 168 | 210 |
| Selective Scanning | 185 | 132 | 147 | 131 | 204 | 182 | 164 | 133 | 151 | 184 | 161 |
| Cache | 0 | 0 | 0 | 0 | 0 | 0 | 0 | 0 | 0 | 0 | 0 |

It should be noted that the selective scanning algorithm is not dependent on the wireless environment. Alternatively, original handoff performance substantially deteriorates with environment. As shown below in Table 4, which includes data from an environment without rogue access points, the selective scanning algorithm is consistent, while the original handoff performance still deteriorates with the environment.

TABLE 4 shows the handoff time, packet loss, and packet delay using the selective scanning alogorithm and/or the caching algorithm in an environment without rogue access points.

| | Handoff time in mobile receiver (ms) | Packet loss in mobile receiver (num of packets) | Handoff time in mobile sender (ms) | Packet delay in mobile sender (num of packets) |
|---|---|---|---|---|
| Original Handoff | 182.5 | 63.2 | 201.5 | 210.7 |
| Selective Scanning | 102.1 | 37.0 | 141.1 | 161.7 |
| Cache | 4.5 | 16.3 | 3.9 | 0 |

It will also be understood that the detailed description herein may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

The system according to the invention may include a general purpose computer, or a specially programmed special purpose computer. The user may interact with the system via e.g., a personal computer or over PDA, e.g., the Internet an Intranet, etc. Either of these may be implemented as a distributed computer system rather than a single computer. Similarly, the communications link may be a dedicated link, a modem over a POTS line, the Internet and/or any other method of communicating between computers and/or users. Moreover, the processing could be controlled by a software program on one or more computer systems or processors, or could even be partially or wholly implemented in hardware.

Although a single computer may be used, the system according to one or more embodiments of the invention is optionally suitably equipped with a multitude or combination of processors or storage devices. For example, the computer may be replaced by, or combined with, any suitable processing system operative in accordance with the concepts of embodiments of the present invention, including sophisticated calculators, hand held, laptop/notebook, mini, mainframe and super computers, as well as processing system network combinations of the same. Further, portions of the system may be provided in any appropriate electronic format, including, for example, provided over a communication line as electronic signals, provided on CD and/or DVD, provided on optical disk memory, etc.

Any presently available or future developed computer software language and/or hardware components can be employed in such embodiments of the present invention. For example, at least some of the functionality mentioned above could be implemented using Visual Basic, C, C++ or any assembly language appropriate in view of the processor being used. It could also be written in an object oriented and/or interpretive environment such as Java and transported to multiple destinations to various users.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

The following references are incorporated by reference herein in their entireties:

General characteristics of international telephone connections and international circuits. ITU-TG, 114, 1998.

M. S. A. Mishra and W. Arbaugh. An Empirical analysis of the IEEE 802.11 MAC Layer Handoff Process. ACM SIGCOMM Computer Communication Review, 33(2):93 {102, April 2003.

M. S. A. Mishra and W. Arbaugh. Context caching using neighbor graphs for fast handoffs in a wireless network. Technical report, University of Maryland, February 2004.

G. Combs. Ethereal network protocol analyzer.

H.-S. K. et. al. Selective channel scanning for fast handoff in wireless LAN using neighbor graph. Japan, July 2004. International Technical Conference on Circuits/Systems, Computer and Communications.

J. Geier. Understanding 802.11 frame types. Technical report, Jupitermedia Corporation, August 2002.

IEEE. IEEE Std. 802.11, Wireless LAN Medium Access Control (MAC) and Physical (PHY) specifications: High Speed Physical Layer Extension in the 2.4 GHz Band, 1999.

A. Jain. Handoff delay for 802.11b wireless LANs. Technical report, University of Kentucky, 2003.

M. Kershaw. Kismet wireless network sniffer.

J. Malinen. Host AP driver for intersil prism2/2.5/3.

S. Park and Y. Choi. Fast inter-ap handoff using predictive-authentication scheme in a public wireless LAN. Networks2002 (Joint ICN 2002 and ICWLHN 2002), August 2002.

S. Park and Y. Choi. Pre-authenticated fast handoff in a public wireless LAN based on IEEE 802.1x mode. Singapore, October 2002. IFIP TC6 Personal Wireless Communications.

What is claimed is:

1. A method for reducing handoff latency for a mobile station in a wireless network, the method comprising:

associating with a first access point, wherein key information that identifies the first access point is stored into a cache located at the mobile station;

determining whether a handoff is necessary;

querying the cache to determine whether another access point is associated with the key information in response to determining that the handoff is necessary;

performing a selective scan of channels at the mobile station upon determining that another access point is not associated with the key information, wherein the selective scan comprises:

accessing a channel mask that is associated with the mobile station;

detecting one or more access points using the channel mask, wherein the mobile station receives one or more responses from the one or more access points; and determining a second access point for association by the mobile station based at least in part on the responses from the one or more access points;

storing information relating to the second access point into the cache located at the mobile station, wherein the information identifies the second access point and is associated with the key information;

transmitting one or more messages to the second access point for association with the second access point; and associating with the second access point in response to receiving an indication from the second access point.

2. The method of claim 1, wherein the step of determining whether the handoff is necessary further comprises determining that the signal strength of the first access point has decreased below a given threshold value.

3. The method of claim 1, wherein the step of determining whether the handoff is necessary further comprises determining that the signal-to-noise ratio of the first access point has decreased below a given threshold value.

4. The method of claim 1, wherein the selective scan further comprises:

inverting the channel mask if the mobile station does not detect one or more access points using the channel mask; and detecting one or more access points using the inverted channel mask.

5. The method of claim 1, wherein the selective scan further comprises:

determining whether the channel mask is associated with the mobile station; and performing a scan of all channels at the mobile station upon determining that the channel mask is not associated with the mobile station.

6. The method of claim 1, further comprising transmitting one or more requests to the first access point for information regarding neighboring access points.

7. The method of claim 1, wherein the wireless network is an 802.11b wireless network, the method further comprising adding channel 1, channel 6, and channel 11 to the channel mask.

8. The method of claim 1, further comprising removing the channel that is currently being used to connect to the second access point from the channel mask.

9. The method of claim 1, wherein the step of determining the second access point based at least in part on the responses from the one or more access points, further comprises determining the second access point based on any one of: signal strength, signal-to-noise ratio, distance from the first access point, and available bandwidth.

10. The method of claim 1, wherein the key information comprises at least one of: SSID, MAC address, IP address, GPS position information, WiFi information, and location information.

11. The method of claim 1 further comprising configuring the mobile station to set a timer for accessing the second access point.

12. A method for reducing handoff latency for a mobile station in a wireless network, the method comprising:
   associating with a first access point, wherein key information that identifies the first access point is stored in a cache located at the mobile station;
   determining whether a handoff is necessary;
   performing a selective scan of channels at the mobile station in response to determining that the handoff is necessary, wherein the selective scan comprises:
      accessing a channel mask that is associated with the mobile station;
      detecting one or more access points using the channel mask, wherein the mobile station receives one or more responses from the one or more access points; and
      determining a second access point for association by the mobile station based at least in part on the responses from the one or more access points;
   associating with the second access point in response to receiving an indication from the second access point; and
   updating the channel mask to remove the channel that is used to connect to the second access point.

13. A system for reducing handoff latency for a mobile station in a wireless network, the system comprising:
   means for associating with a first access point, wherein key information that identifies the first access point is stored into a cache located at the mobile station;
   means for determining whether a handoff is necessary;
   means for querying the cache to determine whether another access point is associated with the key information in response to determining that the handoff is necessary;
   means for performing a selective scan of channels at the mobile station upon determining that another access point is not associated with the key information, wherein the selective scan comprises:
      means for accessing a channel mask that is associated with the mobile station;
      means for detecting one or more access points using the channel mask, wherein the mobile station receives one or more responses from the one or more access points; and
      means for determining a second access point for association by the mobile station based at least in part on the responses from the one or more access points;
   means for storing information relating to the second access point into the cache located at the mobile station, wherein the information identifies the second access point and is associated with the key information;
   means for transmitting one or more messages to the second access point for association with the second access point; and
   means for associating with the second access point in response to receiving an indication from the second access point.

14. A system for reducing handoff latency for a mobile station in a wireless network, the system comprising:
   means for associating with a first access point, wherein key information that identifies the first access point is stored in a cache located at the mobile station;
   means for determining whether a handoff is necessary;
   means for performing a selective scan of channels at the mobile station in response to determining that the handoff is necessary, wherein the selective scan comprises:
      means for accessing a channel mask that is associated with the mobile station;
      means for detecting one or more access points using the channel mask, wherein the mobile station receives one or more responses from the one or more access points; and
      means for determining a second access point for association by the mobile station based at least in part on the responses from the one or more access points;
   means for associating with the second access point in response to receiving an indication from the second access point; and
   means for updating the channel mask to remove the channel that is used to connect to the second access point.

15. A system for reducing handoff latency in a wireless network, the system comprising:
   a mobile station that is associated with a first access point, the mobile station comprising:
      memory;
      a processor at least partially executing a handoff application program configured to:
         store key information that identifies the first access point in a cache located at the mobile station;
         determine whether a handoff is necessary;
         query the cache to determine whether another access point is associated with the key information in response to determining that the handoff is necessary;
         perform a selective scan of channels at the mobile station upon determining that another access point is not associated with the key information, wherein processor is further configured to:
            access a channel mask that is associated with the mobile station;
            detect one or more access points using the channel mask, wherein the mobile station receives one or more responses from the one or more access points; and
            determine a second access point for association by the mobile station based at least in part on the responses from the one or more access points;
         store information relating to the second access point into the cache located at the mobile station, wherein the information identifies the second access point and is associated with the key information;
         transmit one or more messages to the second access point for association with the second access point; and
         associate with the second access point in response to receiving an indication from the second access point.

16. The system of claim 15, wherein the processor is further configured to determine that the signal strength of the first access point has decreased below a given threshold value.

17. The system of claim 15, wherein the processor is further configured to determine that the signal-to-noise ratio of the first access point has decreased below a given threshold value.

18. The system of claim 15, wherein the processor is further configured to:
   invert the channel mask if the mobile station does not detect one or more access points using the channel mask; and
   detect one or more access points using the inverted channel mask.

19. The system of claim 15, wherein the processor is further configured to:

determine whether the channel mask is associated with the mobile station; and perform a scan of all channels at the mobile station upon determining that the channel mask is not associated with the mobile station.

20. The system of claim 15, wherein the processor is further configured to transmit one or more requests to the first access point for information regarding neighboring access points.

21. The system of claim 15, wherein the processor is further configured to remove the channel that is currently being used to connect to the second access point from the channel mask.

22. The system of claim 15, wherein the processor is further configured to configure the mobile station to set a timer for accessing the second access point.

23. A system for reducing handoff latency in a wireless network, the system comprising:

a mobile station that is associated with a first access point, the mobile station comprising:

memory;

a processor at least partially executing a handoff application program configured to:

store key information that identifies the first access point in a cache located at the mobile station;

determine whether a handoff is necessary;

perform a selective scan of channels at the mobile station in response to determining that the handoff is necessary, wherein the processor is further configured to:

access a channel mask that is associated with the mobile station;

detect one or more access points using the channel mask, wherein the mobile station receives one or more responses from the one or more access points; and determine a second access point for association by the mobile station based at least in part on the responses from the one or more access points;

associate with the second access point in response to receiving an indication from the second access point; and update the channel mask to remove the channel that is used to connect to the second access point.

* * * * *

UNITED STATES PATENT AND TRADEMARK OFFICE
CERTIFICATE OF CORRECTION

PATENT NO. : 7,636,336 B2  
APPLICATION NO. : 11/070936  
DATED : December 22, 2009  
INVENTOR(S) : Forte et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 887 days.

Signed and Sealed this

Ninth Day of November, 2010

David J. Kappos  
*Director of the United States Patent and Trademark Office*